United States Patent [19]

Iwasaki et al.

[11] Patent Number: 5,980,847
[45] Date of Patent: Nov. 9, 1999

[54] METHOD FOR REMOVING NITROGEN OXIDE

[75] Inventors: Morihiko Iwasaki; Masatoshi Nozaki, both of Tokyo; Haruhiko Tsubogami, Kagawa-ken; Hideaki Asano, Ohsaku-fu, all of Japan

[73] Assignee: Mitsubishi Materials Corporation, Tokyo, Japan

[21] Appl. No.: 08/814,681

[22] Filed: Mar. 11, 1997

Related U.S. Application Data

[63] Continuation of application No. 08/428,777, Apr. 24, 1995, abandoned.

[51] Int. Cl.⁶ .................................................. B01D 53/56
[52] U.S. Cl. ........................................ 423/239.1; 423/235
[58] Field of Search ................................ 423/239.1, 235

[56] References Cited

U.S. PATENT DOCUMENTS

| | | | |
|---|---|---|---|
| 3,897,366 | 7/1975 | Nakamura | 423/213.2 |
| 4,036,593 | 7/1977 | Satoh | 422/171 |
| 4,157,315 | 6/1979 | Michels et al. | 423/239.1 |
| 4,280,926 | 7/1981 | Abe et al. | 423/213.2 |
| 4,661,329 | 4/1987 | Suzuki et al. | 423/245 |
| 5,112,587 | 5/1992 | von Wedel et al. | 423/235 |
| 5,366,711 | 11/1994 | von Wedel et al. | 423/239.1 |
| 5,462,693 | 10/1995 | Ichimura et al. | 252/190 |

FOREIGN PATENT DOCUMENTS 6-114237  4/1994  Japan.

OTHER PUBLICATIONS

Translation of JP 6–114237, Apr. 26, 1994.

*Primary Examiner*—Thomas Dunn
*Attorney, Agent, or Firm*—McAulay Nissen Goldberg Kiel & Hand, LLP

[57] ABSTRACT

The invention relates to a method and apparatus for removing nitrogen oxide from gas (exhaust gas) discharged, for example, in the steps of plating, washing with acids, dissolution, etc. The removing method comprises making a liquid capable of absorbing and removing nitrogen oxide adhered onto the surfaces of glass fibers followed by making a gas containing nitrogen oxide brought into contact with said glass fibers while making said nitrogen oxide absorbed by the liquid adhered onto the surfaces of said glass fibers to thereby remove said nitrogen oxide from said gas. According to this method, since a gas containing nitrogen oxide is brought into contact with a liquid capable of absorbing and removing nitrogen oxide from the gas, that has adhered on the surfaces of glass fibers, the nitrogen oxide is efficiently absorbed by said liquid and is therefore efficiently removed from said gas.

6 Claims, 5 Drawing Sheets

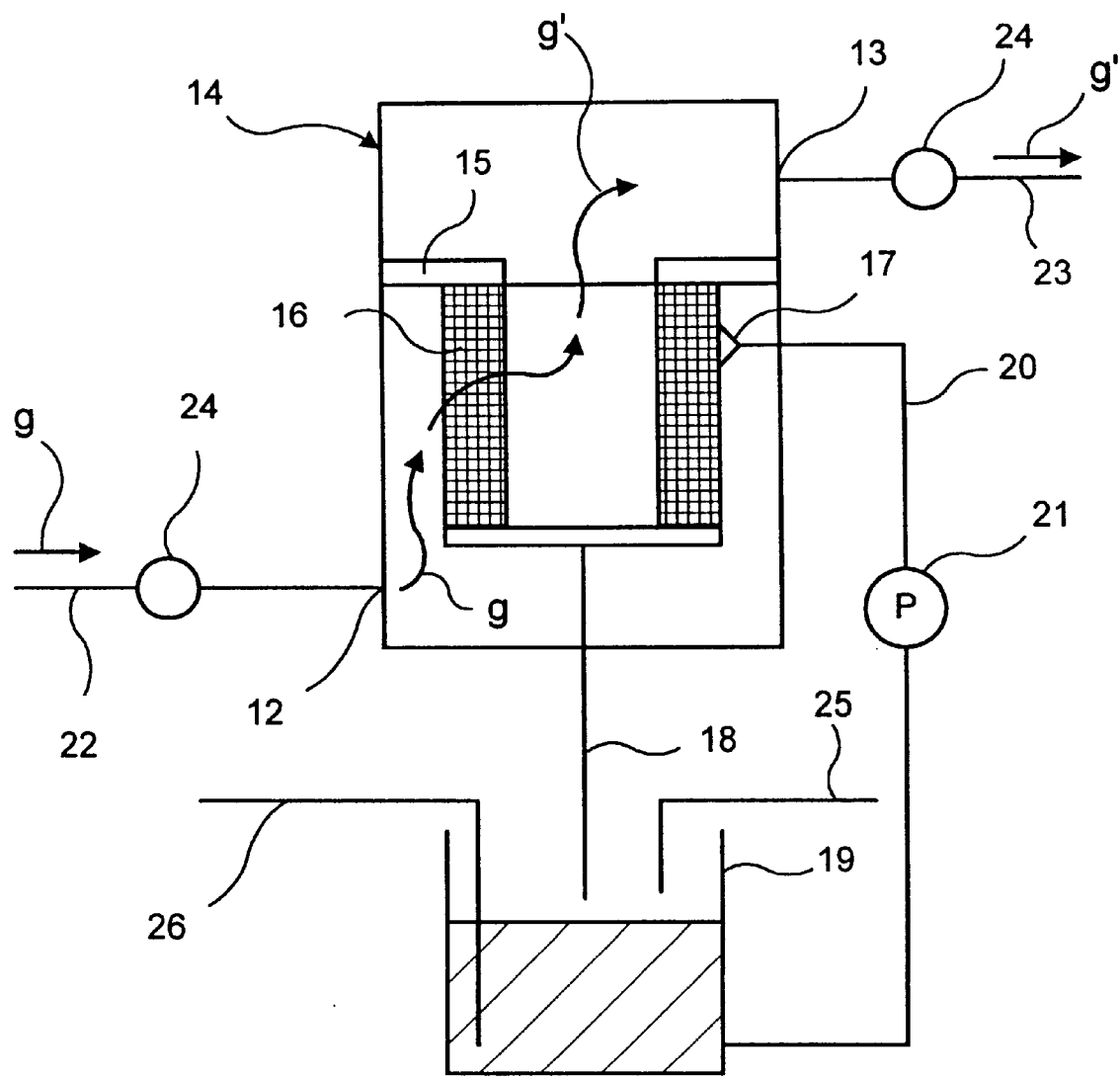
F I G. 4

METHOD FOR REMOVING NITROGEN OXIDE

This is a continuation of application Ser. No. 08/428,777 filed Apr. 24, 1995 now abandoned.

BACKGROUND OF THE INVENTION

1. Field of the Invention

The present invention relates to a method and apparatus for removing nitrogen oxide from gas (exhaust gas) discharged, for example, in the steps of plating, washing with acids, dissolution, etc.

2. Prior Art

Heretofore, it is known that gas (exhaust gas) is discharged, for example, in the steps of plating, washing with acids, dissolution, etc., for surface treatment of metals, etc. To remove nitrogen oxide from such exhaust gas, known is a method of spraying a mist of a liquid containing aqueous hydrogen peroxide and sodium hydroxide over said exhaust gas to make said liquid react with the nitrogen oxide in the exhaust gas followed, thereby removing the nitrogen oxide from the exhaust gas. Apparatus to which this method is applied have been put to practical use.

However, this conventional method, as using such a liquid containing aqueous hydrogen peroxide and sodium hydroxide, had a problem in that special care shall be taken in handling the sodium hydroxide which is a strong alkali. In addition, since such a mist comprising aqueous hydrogen peroxide and sodium hydroxide is brought into contact with exhaust gas in said conventional method, the method had still another problem in that the contact efficiency between the mist and exhaust gas is poor and therefore the efficiency of removing nitrogen oxide from the gas is poor.

SUMMARY OF THE INVENTION

The present invention has been made so as to overcome the above-mentioned problems, and its subject matter is to provide a method and apparatus for removing nitrogen oxide from gas, in which the contact efficiency with gas is elevated and therefore the efficiency of removing nitrogen oxide from gas is elevated.

Specifically, the present invention provides a method for removing nitrogen oxide from gas, comprising making a liquid capable of absorbing and removing nitrogen oxide adhered onto the surfaces of glass fibers followed by making a gas containing nitrogen oxide brought into contact with said glass fibers while making said nitrogen oxide absorbed by the liquid adhered onto the surfaces of said glass fibers to thereby remove said nitrogen oxide from said gas.

According to the removing method of the present invention where a liquid capable of absorbing and removing nitrogen oxide is adhered onto the surfaces of glass fibers and thereafter a gas containing nitrogen oxide is brought into contact with said glass fibers to thereby make said nitrogen oxide absorbed by said liquid adhered on the glass fibers, it is possible to make the nitrogen oxide in the gas efficiently absorbed by said liquid and therefore to efficiently remove the nitrogen oxide from the gas, since the nitrogen oxide-containing gas is brought into contact with the liquid adhered onto the surfaces of glass fibers.

The present invention also provides an apparatus for removing nitrogen oxide from gas, comprising a reaction vessel equipped with a gas-introducing inlet through which a gas containing nitrogen oxide is introduced into the reaction vessel and a gas-discharging outlet through which the gas, from which nitrogen oxide has been removed, is discharged from the reaction vessel, laminate filter(s) of glass fibers provided in said reaction vessel between said gas-introducing inlet and said gas-discharging outlet, and nozzle(s) through which a liquid capable of absorbing and removing nitrogen oxide is jetted out onto the surface(s) of said filter(s).

According to the constitution of this removing apparatus of the present invention, a liquid capable of absorbing and removing nitrogen oxide is jetted out onto the surface(s) of the filter(s) through the nozzle(s) so that the liquid is made adhered onto the glass fibers constituting the filter(s), a gas containing nitrogen oxide is therefore made brought into efficient contact with said liquid adhered on the surfaces of said glass fibers while it passes through the filter(s), and the nitrogen oxide is efficiently removed from the gas. Using this removing apparatus, therefore, it is possible to efficiently remove nitrogen oxide from exhaust gas.

The present invention also provides another apparatus for removing nitrogen oxide from gas comprising a plurality of nitrogen oxide-removing units arranged in series, in which said nitrogen oxide-removing units each comprise a reaction vessel equipped with a gas-introducing inlet through which a gas containing nitrogen oxide is introduced into the reaction vessel and a gas-discharging outlet through which the gas, from which nitrogen oxide has been removed, is discharged from the reaction vessel, laminate filter(s) of glass fibers provided in said reaction vessel between said gas-introducing inlet and said gas-discharging outlet, nozzle(s) through which a liquid capable of absorbing and removing nitrogen oxide is jetted out onto the surface(s) of said filter(s), and a tank to pool therein the liquid that has absorbed nitrogen oxide and has discharged from said reaction vessel, and in which said nitrogen oxide-removing units are arranged in series in such a way that the gas-discharging outlet in the former unit is connected with the gas-introducing inlet in the next unit.

According to the constitution of this removing apparatus of the present invention, the plural nitrogen oxide-removing units are arranged in series in such a way that the gas-discharging outlet in the former unit is connected with the gas-introducing inlet in the next unit, and therefore nitrogen oxide is efficiently removed from the gas introduced into said apparatus having such simple constitution. In addition, since the constitution of this apparatus is simple, the cost of the apparatus itself is low and the maintenance thereof is easy.

BRIEF DESCRIPTION OF THE DRAWINGS

FIG. 4 is a constitutional view showing the outline of the apparatus for removing nitrogen oxide of Example 2 of the present invention.

DESCRIPTION OF PREFERRED EMBODIMENTS OF THE INVENTION

Preferred embodiments of the method and apparatus for removing nitrogen oxide of the present invention are described hereinunder with reference to the drawings attached hereto.

EXAMPLE 1

Figure 1:
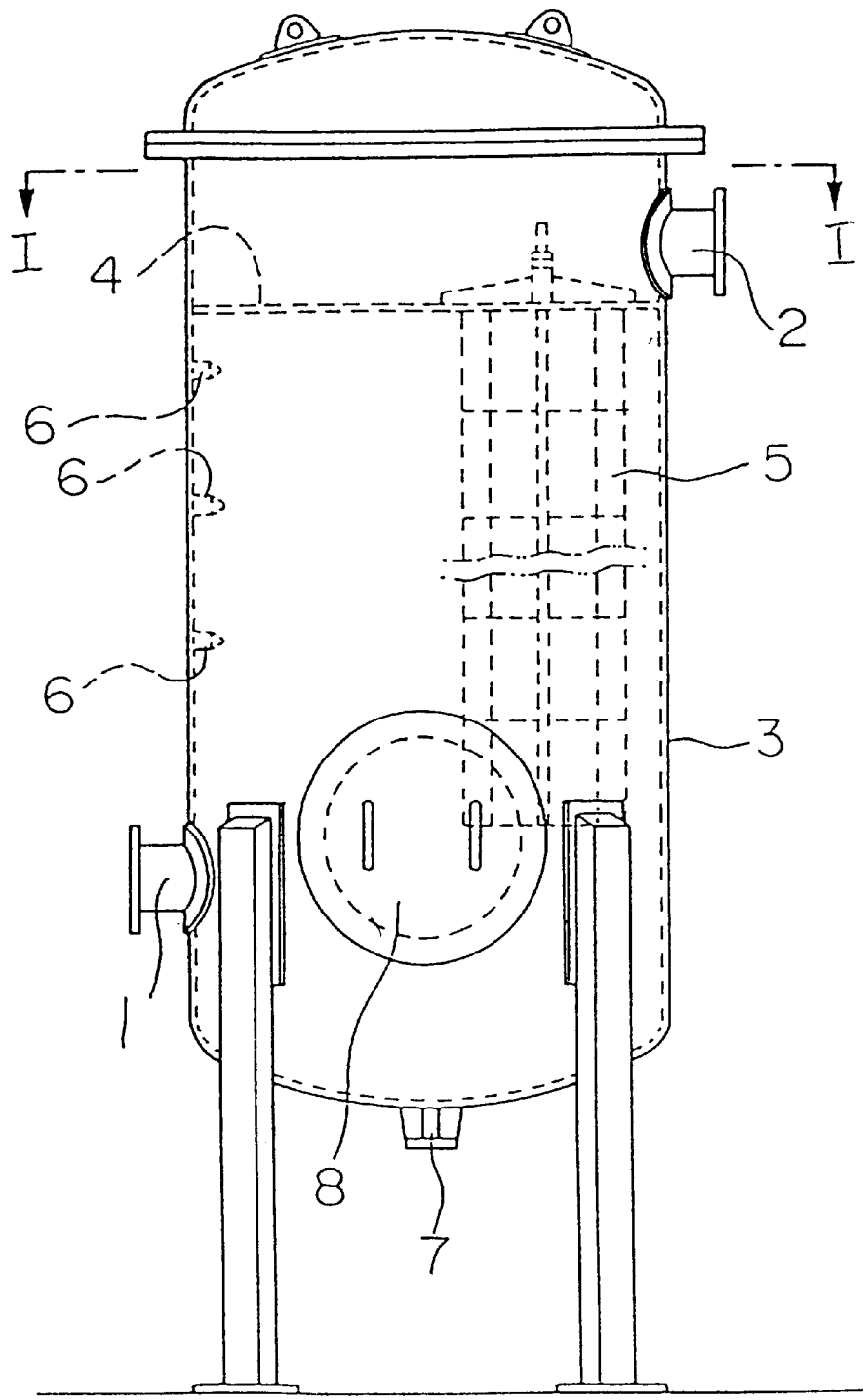
FIG. 1 is a front vertical view of the apparatus for removing nitrogen oxide of Example 1 of the present invention.
Figure 2:
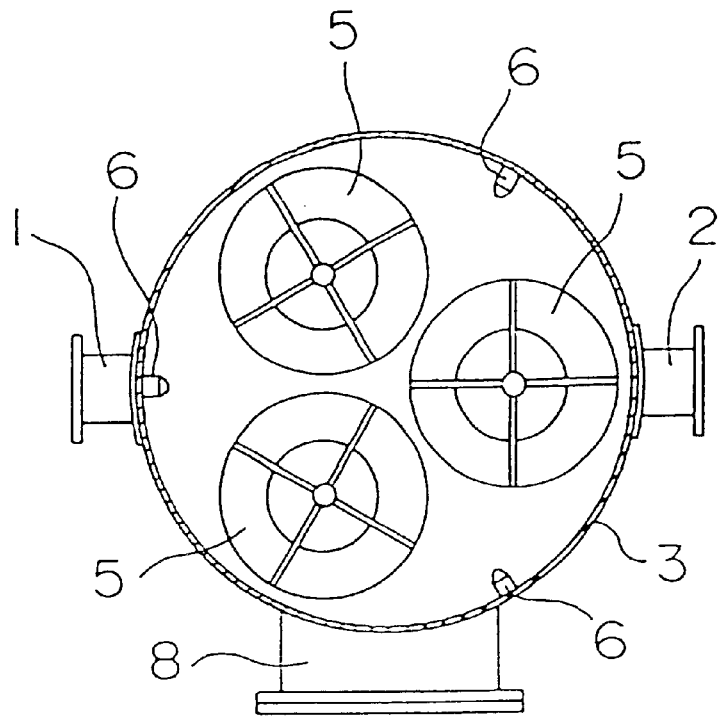
FIG. 2 is a cross-sectional view of the apparatus of FIG. 1 cut along I—I line.

The apparatus for removing nitrogen oxide of this example is illustrated in FIG. 1 and FIG. 2, which comprises a reaction vessel 3 equipped with a gas-introducing inlet 1 through which exhaust gas is introduced into the reaction vessel 3 and a gas-discharging outlet 2 through which the gas, from which nitrogen oxide has been removed, is discharged from the reaction vessel 3, a partition board 4 by which said reaction vessel 3 is partitioned into two rooms, three filters 5 fitted to said partition board 4 between said inlet 1 and said outlet 2, and plural nozzles 6 through which an aqueous solution of hydrogen peroxide (which oxidizes and removes nitrogen oxide) is jetted out onto the surfaces of said filters 5.

At the bottom of said reaction vessel 3, provided is a drain 7 through which the excess aqueous solution of hydrogen peroxide that has been jetted out through the nozzles 6 and the reaction product to be formed by the reaction of the aqueous solution of hydrogen peroxide with nitrogen oxide in the gas introduced into said reaction vessel 3 is discharged. In addition, at the side wall in the lower part of said reaction vessel 3, provided is a manhole 8 through which an operator checks the inside of the reaction vessel 3 for its maintenance.

Figure 3:
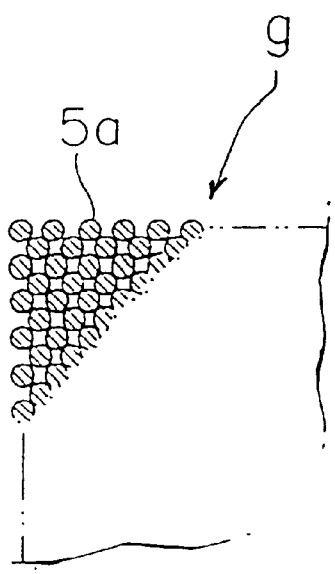
FIG. 3 is an enlarged cross-sectional view of a part of the filter in the apparatus of FIG. 1.

The filter 5 is, as shown in FIG. 3, a laminate composed of 24 cylindrical filter elements, each of which has been made by winding up glass fibers 5a each having a diameter of 12 $\mu$m to a thickness of 70 mm, and has a density of 280 kg/m$^3$.

The density of said filter composed of glass fibers 5a may be selected from a range between 250 kg/m$^3$ and 300 kg/m$^3$. This is because, if the density is more than 300 kg/M$^3$, the aerial space in said filter is almost completely filled with the aqueous solution of hydrogen peroxide jetted out to the filter with the result that the filter can no more ensure a sufficient space through which the exhaust gas applied thereto can pass, thereby increasing the pressure loss through the filter itself. If, however, it is less than 250 kg/M$^3$, the aerial space between the glass fibers 5a in the filter is too large with the result that the contact efficiency between the aqueous solution of hydrogen peroxide and the exhaust gas is lowered and therefore the efficiency of the filter itself to remove nitrogen oxide from the exhaust gas is lowered.

The concentration of the aqueous solution of hydrogen peroxide to be jetted out through the nozzles 6 is from 0.1 to 10% by weight. This is because, if the concentration is less than 0.1% by weight, the reaction speed is too low for practical use. If, however, it is more than 10% by weight, the loss of oxygen due to the self-reaction is increased. The pH value of this solution is not specifically defined but may be any desired one.

Next, the function of the apparatus of this example of removing nitrogen oxide is described hereinunder, while referring to the method of removing nitrogen oxide according to the present invention.

Exhaust gas is introduced into the reaction vessel 3 through its inlet 1, which then passes through the filters 5 and is discharged out of the reaction vessel 3 through the outlet 3. An aqueous solution of hydrogen peroxide is jetted out toward the filters 5 through the nozzles 6, and the surfaces of the glass fibers 5a constituting each filter 5 are wetted with said solution. While passing through the thus-wetted glass fibers 5a, the exhaust gas is brought into contact with the aqueous solution of hydrogen peroxide and the nitrogen oxide in the exhaust gas is removed therefrom according to the following reactions.

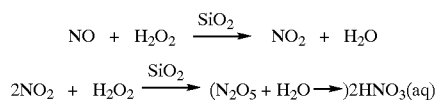

According to this example, therefore, since the aqueous solution of hydrogen peroxide is adhered to the glass fibers 5a and the exhaust gas is brought into contact with these glass fibers 5a, the glass fibers 5a each act as a catalyst to promote the above-mentioned reactions. In addition, since the density of the glass fibers 5a in each filter is from 250 to 300 kg/m$^3$ and therefore the surface area of each filter 5 is large, the contact efficiency between the exhaust gas and the aqueous solution of hydrogen peroxide is improved and therefore the efficiency of the aqueous solution to remove the nitrogen oxide from the exhaust gas is improved. The dilute nitric acid to be formed by the reactions is taken out of the reaction vessel 3 through the drain 7.

The experimental results obtained by the removing method of this example and those obtained by a conventional method (comparative example) are shown in Table 1 below, while being compared with each other.

TABLE 1

|  | Treatment | Amount of Gas Treated | Initial Concentration of Nitrogen Oxide in Gas before Treatment | Concentration of Nitrogen Oxide in Gas after Treatment |
| --- | --- | --- | --- | --- |
| Example of the Invention | An aqueous solution of hydrogen peroxide is applied onto filters of glass fibers, and exhaust gas is passed through the filters. | 20 m$^3$/min | 1000 ppm | 70 ppm |
| Comparative Example | A mist of an aqueous solution of hydrogen peroxide is mixed with exhaust gas. | 20 m$^3$/min | 1000 ppm | 390 ppm |

As shown in Table 1 above, the concentration of nitrogen oxide in the exhaust gas treated according to this example of the present invention is about 0.18 times that of nitrogen oxide in the exhaust gas treated according to the comparative example of the conventional method. From this, therefore, it is known that the efficiency of the method of the present invention of removing nitrogen oxide has been improved.

According to the apparatus and the method for removing nitrogen oxide of this example, since the exhaust gas is passed through the filters 5 wetted with the aqueous solution of hydrogen peroxide to thereby remove nitrogen oxide from the gas, the apparatus and the method are simple and their maintenance is easy.

In addition, according to the apparatus and the method for removing nitrogen oxide of this example, since the aqueous solution of hydrogen peroxide is once adhered to the filters and thereafter the exhaust gas is brought into contact with said solution on said filters, it is unnecessary to mix a mist of said solution with the exhaust gas as in the conventional method and the amount of the mist of said solution which accompanys the discharged gas is extremely small. Therefore, since the apparatus of this example does not need any additional means for treating the mist, its cost is lowered. Moreover, it is easy to apply any non-constant source of generating exhaust gas to the apparatus of this example.

Furthermore, according to the apparatus and the method for removing nitrogen oxide of this example, since the filter elements 9 of each filter 5 are composed of glass fibers 5a, these glass fibers 5a each act as a catalyst to elevate the efficiency of the filter itself to remove nitrogen oxide. In addition, since the glass fibers 5a are chemically stable, the life of the filter is extremely long.

In addition, according to the apparatus and the method for removing nitrogen oxide of this example, since the nitrogen oxide removed is formed into a dilute nitric acid, the dilute nitric acid recovered can be effectively used.

In addition, according to the apparatus and the method for removing nitrogen oxide of this example, since the liquid circulating through the apparatus is only the aqueous solution of hydrogen peroxide, the maintenance of the apparatus is easy.

EXAMPLE 2

FIG. 4 is referred to, which is a constitutional view showing the outline of the apparatus for removing nitrogen oxide of Example 2 of the present invention.

This apparatus for removing nitrogen oxide comprises a reaction vessel 14 equipped with a gas-introducing duct 12, through which a gas (g) containing NOx (nitrogen oxide) is introduced into said reaction vessel 14, at the lower part thereof, and with a gas-discharging outlet 13, through which the gas (g) from which NOx has been removed is discharged from said reaction vessel 14, at the upper part thereof; a partition board 15 which is provided in said reaction vessel 14 to horizontally partition the reaction vessel 14 into two rooms; a bottomed cylindrical filter 16 composed of a laminate of glass fibers, which is provided at the opening of the center of said partition board 15; a nozzle 17 through which city water capable of absorbing NOx is jetted out onto the surface of said filter 16; a drain 18 provided at the bottom of said reaction vessel 14, through which the city water that has absorbed NOx is drained; a tank 19 in which the city water that has absorbed NOx and has been drained through the drain 18 is pooled; a duct 20 provided between said nozzle 17 and said tank 19 to connect these; and a pump (feeding means) 21 provided in the midway of said duct 20, which acts to feed the city water that has absorbed NOx and has pooled in the tank 19 to the nozzle 17.

A duct 22 is connected to the gas-introducing inlet 12 while a duct 23 to the gas-discharging outlet 13, and these ducts 22 and 23 each are provided with a sensor 24 to detect NOx.

Said tank 19 is provided with a water supply duct 25 through which city water is fed into the tank 19 and also with a drain 26 through which the city water that has absorbed NOx is drained out of the tank 19.

The filter 16 is, as shown in FIG. 3, a laminate composed of 24 cylindrical filter elements, each of which has been made by winding up glass fibers 5a each having a diameter of 12 μm to a thickness of 70 mm, and has a density of 280 kg/m$^3$.

The density of said filter 16 may be selected from a range between 250 kg/m$^3$ and 300 kg/m$^3$, depending on the size of the filter itself, the flow rate of the gas to pass through the filter, the amount of the city water to be jetted out onto the filter, etc.

Next, the method for removing NOx of this example is described hereinunder, where the above-mentioned apparatus is used.

In this apparatus, the surface of the filter 16 is always wetted with city water jetted out thereonto through the nozzle 17.

When a gas (g) containing NOx is introduced into the reaction vessel 14 through the gas-introducing inlet 12, said gas (g) invades said filter 16 through the surface of the outer periphery of the filter 16, then passes through the filter 16 and thereafter flows upward via the surface of the inner periphery of the filter 16. Afterwards, the gas (g) passes through the opening of the partition board 15 and is then discharged through the gas-discharging outlet 13. While passing through the filter 16, said gas (g) is brought into contact with the city water that has adhered on the surfaces of the glass fibers 5a of said filter 16, by which NOx is absorbed and removed from the gas (g). After having passed through the filter 16 in this way, the gas (g) becomes a gas (g') from which NOx has been removed.

The city water that has absorbed NOx and has been drained from the reaction vessel 14 is pooled in the tank 19, and this is circulated to the nozzle 17 by the action of the pump 21 and is re-used in the apparatus. The thus-circulated city water that has absorbed NOx further absorbs NOx in the gas (g) while being re-circulated through the apparatus.

NOx that has been absorbed by the city water is, though presumed, oxidized with oxygen existing on the surfaces of the glass fibers 5a to be converted into nitric acid while it is brought into contact with city water and is absorbed by the city water. Therefore, the city water that has absorbed NOx is to be converted into nitric acid. While the city water that has absorbed NOx, namely, nitric acid is re-circulated and re-used in this apparatus, it finally becomes a highly-concentrated nitric acid, since all the NOx absorbed by the re-circulated water is converted into nitric acid.

A part of the highly-concentrated nitric acid is drained outside through the drain 26 and recovered. On the other hand, fresh city water is added to the tank 19 via the water duct 25 to thereby compensate the reduction in the water in the tank 19.

According to this example mentioned hereinabove, city water is adhered onto the glass fibers 5a and the gas (g)

containing NOx is brought into contact with the city water adhered on the glass fibers 5a. Therefore, NOx in the gas (g) is efficiently brought into contact with the city water adhered on the glass fibers 5a and is absorbed by said city water, and hence NOx is removed from the gas (g). Since the thus-absorbed NOx is oxidized in said city water to be converted into nitric acid having a concentration of from 5% to 25%, it can be recovered and recycled as concentrated nitric acid.

Table 2 below shows the results of the experiments that have been conducted to confirm the effect of this example. In these experiments, an NOx-containing gas to be treated was passed through the apparatus at a flow rate of 0.4 m³/min and 0.8 m³/min, for 2 hours. The mean degrees of removal of NOx obtained in these two experiments were compared with each other. Apart from these, a comparative example of a conventional method was conducted, where a mist of city water was jetted into an NOx-containing gas flowing at a flow rate of 0.8 m³/min for 2 hours and the mean degree of removal of NOx was obtained and compared with the above-mentioned two.

In addition, in the apparatus of this example, since the duct 20 has been provided between the nozzle 17 and the tank 19 to connect these in order that the NOx-absorbed city water that has been pooled in the tank 19 can be circulated to the nozzle 17 through the duct 20 by the action of the pump 21 provided in the midway of said duct 20, the water that has absorbed nitrogen oxide can be re-used and, in addition, can be recovered and recycled as concentrated nitric acid. Moreover, since water is re-circulated through the apparatus as mentioned hereinabove, the working cost of the apparatus is low.

EXAMPLE 3

Figure 5:
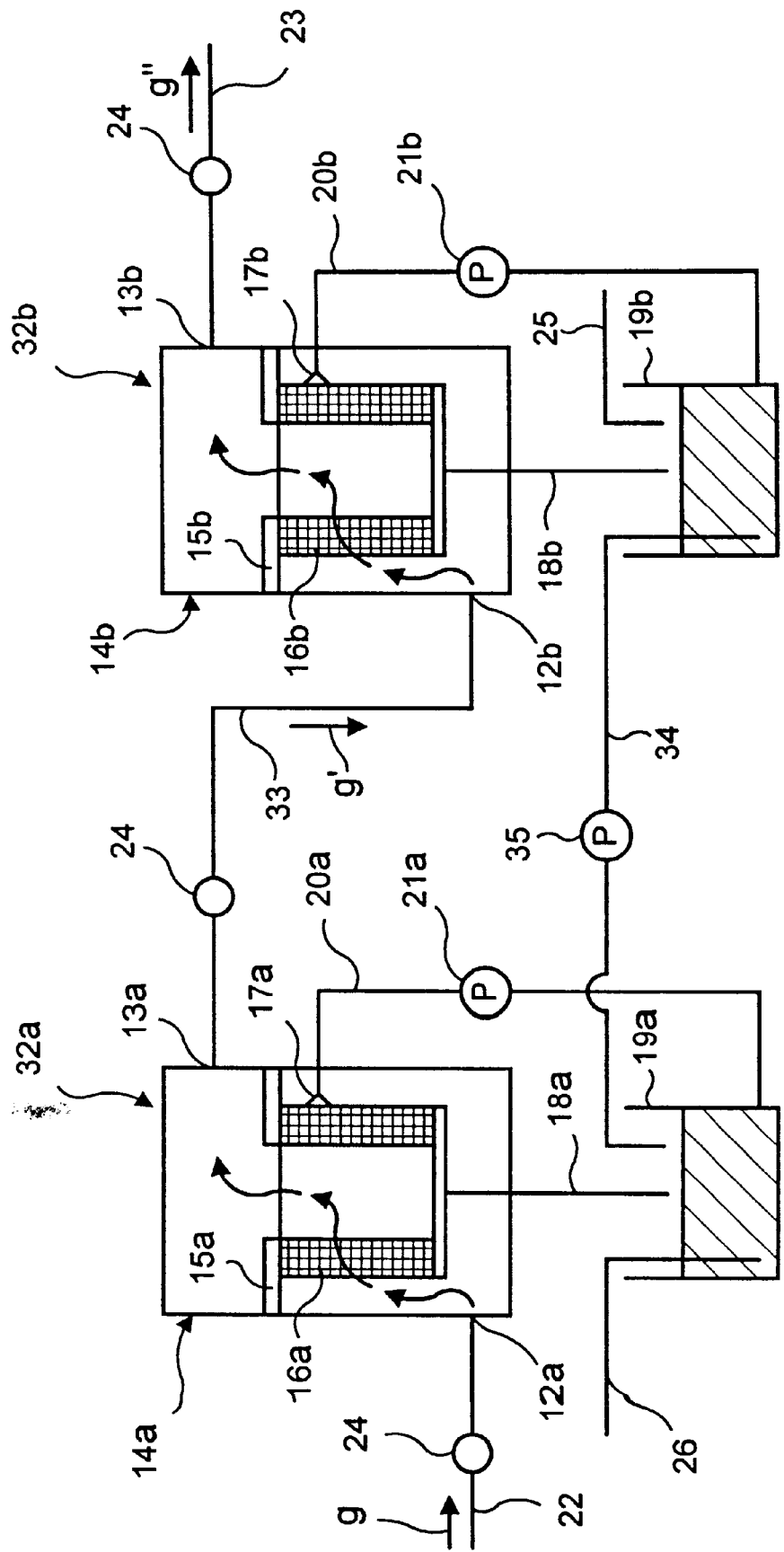
FIG. 5 is a constitutional view showing the outline of the apparatus for removing nitrogen oxide of Example 3 of the present invention.

FIG. 5 is referred to, which is a constitutional view showing the outline of the apparatus for removing nitrogen oxide of Example 3 of the present invention.

This apparatus for removing nitrogen oxide comprises nitrogen oxide-removing units 32a and 32b that have been connected in series, in which NOx is removed from an NOx-containing gas in two steps. The constitution of each of

TABLE 2

|  | Amount of Gas Treated (m³/min) | Mean Concentration of NOx in Gas before Treatment (ppm) | Mean Concentration of NOx in Gas after Treatment (ppm)* | Mean Degree of Removal of NOx (%)+ |
| --- | --- | --- | --- | --- |
| Example A of the Invention | 0.4 | 180000 | 13400 | 92.6 |
| Example B of the Invention | 0.8 | 180000 | 36300 | 79.8 |
| Comparative Example | 0.8 | 180000 | 126400 | 29.8 |

*: Mean concentration of NOx in the treated gas during the treatment for 2 hours.
+: Mean degree of removal of NOx from the treated gas during the treatment for 2 hours.

As in Table 2 above, the mean degree of removal of NOx from the gas treated according to this example was 92.6% when the flow rate of the gas to be treated in the apparatus was 0.4 m³/min and was 79.8% when the flow rate of the same was 0.8 m³/min. However, the mean degree of removal of NOx from the gas treated according to the conventional method was only 29.8%. From these data, it is known that the amount of NOx to be removed by the method of the present invention is from 2.7 to 3.1 times the amount of NOx to be removed by the conventional method. It is obvious that the efficiency of the method of the present invention to remove NOx from an NOx-containing gas is much improved over that of the conventional method.

According to the method for removing nitrogen oxide of this example that has been demonstrated hereinabove, since city water is first adhered onto the surfaces of the glass fibers 5a and then the gas (g) containing NOx is brought into contact with the city water on the glass fibers 5a whereby NOx is absorbed by the city water, it is possible to efficiently remove NOx from the gas (g).

In addition, the apparatus for removing nitrogen oxide of this example has a simple structure comprising the reaction vessel 14 equipped with the gas-introducing inlet 12 and the gas-discharging outlet 13; the partition board 15 provided in said reaction vessel 14; the bottomed cylindrical filter 16 provided at the opening of said partition board 15; the nozzle 17 through which city water is jetted out onto said filter 16; and the tank 19 in which the NOx-absorbed city water that has been drained from said reaction vessel 14 is pooled. Using the apparatus of this example having such a simple structure, NOx can be removed efficiently from the gas (g). In addition, since the apparatus is simple, the cost of the apparatus itself is low and the maintenance of the apparatus is easy.

these nitrogen oxide-removing units 32a and 32b is the same as that of the removing apparatus of the above-mentioned Example 2. The reference numbers in each unit are represented by the same ones in the apparatus of Example 2, except that the additional codes "a" and "b" are added to the corresponding reference numbers in the first unit and the second unit, respectively. The detailed description of these constitutive elements in these units is omitted herein.

The two nitrogen oxide-removing units 32a and 32b are connected via a duct 33 which connects the gas-discharging outlet 13a in the unit 32a and the gas-introducing inlet 12b in the unit 32b. This duct 33 is provided with a sensor 24 to detect NOx in its midway. The tanks 19a and 19b are connected via a duct 34, and the duct 34 is provided with a pump 35 by which the NOx-containing city water pooled in the tank 19b is circulated into the tank 19a.

Next, the method for removing NOx of this example where the above-mentioned apparatus is used is described hereinunder.

In this method, the nitrogen oxide-removing unit 32a is used as an apparatus for recovering and concentrating nitric acid, while the nitrogen oxide-removing unit 32b is used as an apparatus for removing NOx. The surface of the filter 16a (16b) is always wetted with city water that has been jetted out thereonto through the nozzle 17a (17b).

When a gas (g) containing NOx is introduced into the reaction vessel 14a in the nitrogen oxide-removing unit 32a of the former stage through the gas-introducing inlet 12a, said gas (g) invades the filter 16a through the surface of the outer periphery of said filter 16a, then passes through the filter 16a and thereafter flows upward via the surface of the inner periphery of the filter 16a. Afterwards, the gas (g) passes through the opening of the partition board 15a and is then introduced into the nitrogen oxide-removing unit 32b of the latter stage, via the gas-discharging outlet 13a and the duct 33. While passing through the filter 16a, said gas (g) is brought into contact with the city water that has adhered on the surfaces of the glass fibers 5a of said filter 16a, by which NOx is absorbed and removed from the gas (g). After having passed through the filter 16a in this way, the gas (g) becomes a gas (g') from which NOx has been removed.

This gas (g') still contains a relatively large amount of NOx. After this gas (g') has been introduced into the reaction vessel 14b in the nitrogen oxide-removing unit 32b, this invades the filter 16b through the surface of the outer periphery of said filter 16b, then passes through the filter 16b and thereafter flows upward via the surface of the inner periphery of the filter 16b. Afterwards, the gas (g') passes through the opening of the partition board 15b and is then discharged through the gas-discharging outlet 13b. While passing through the filter 16b, said gas (g') is brought into contact with the city water that has adhered on the surfaces of the glass fibers 5a of said filter 16b, by which NOx is further absorbed and removed from the gas (g'). After having passed through the filter 16b in this way, the gas (g') becomes a gas (g") containing nearly no NOx.

On the other hand, the city water that has absorbed NOx and has been drained from the reaction vessel 14a is pooled in the tank 19a while containing a large amount of NOx. Then, this is circulated to the nozzle 17a by the action of the pump 21a and is re-used in the apparatus. The city water that has absorbed NOx and has been drained from the reaction vessel 14b is pooled in the tank 19b, and this contains a small amount of NOx. Then, this is circulated to the nozzle 17b by the action of the pump 21b and is re-used in the apparatus. On the other hand, city water is added to the tank 19b via the water duct 25, while a part of the NOx-absorbed city water in the tank 19b is circulated to the tank 19a by the action of the pump 35, and the water in the tank 19b is drained through the drain 26 and collected.

NOx that has been absorbed by city water in the apparatus of this example is oxidized by oxygen existing on the surfaces of the glass fibers 5a to be converted into nitric acid, while it is brought into contact with city water and is absorbed by the same, in the same manner as in the above-mentioned Example 2. Therefore, the city water that has absorbed NOx is converted into nitric acid. While the city water that has absorbed NOx, namely, nitric acid is re-circulated and re-used in this apparatus, it finally becomes a highly-concentrated nitric acid, since all the NOx absorbed by the re-circulated water is converted into nitric acid.

According to this example, the removal of NOx from the gas (g) is conducted in two stages that have been described in detail hereinabove. Therefore, NOx is efficiently removed from the gas (g) in said two stages. NOx that has been absorbed by city water on the surfaces of the glass fibers 5a is oxidized in said city water, like in the above-mentioned Example 2, to be converted into nitric acid having a concentration of from 25% to 30%, and hence, it can be recovered and recycled as concentrated nitric acid.

Table 3 below shows the results of the experiments that have been conducted to confirm the effect of the two-stage removing apparatus of this example. In order to compare the effect of the two-stage removing apparatus of this example with that of the one-stage removing apparatus of the above-mentioned Example 2, the Example B of the above-mentioned Example 2 is referred to as Comparative Example A in Table 3. In addition, the conventional process referred to in Table 2 as Comparative Example was repeated two times and the data obtained are shown in Table 3 as those of Comparative Example B.

TABLE 3

|  | Amount of Gas Treated (m³/min) | Mean Concentration of NOx in Gas before Treatment (ppm) | Mean Concentration of NOx in Gas after Former-stage Treatment (ppm)* | Mean Concentration of NOx in Gas after Latter-stage Treatment (ppm)* | Mean Degree of Removal of NOx (%)+ |
| --- | --- | --- | --- | --- | --- |
| Example of the Invention | 0.8 | 180000 | 41400 | 7900 | 95.6 |
| Comparative Example A | 0.8 | 180000 | 36300 | — | 79.8 |
| Comparative Example B | 0.8 | 180000 | 127900 | 104700 | 41.8 |

*: Mean concentration of NOx in the treated gas during the treatment for 2 hours.
+: Mean degree of removal of NOx from the treated gas during the treatment for 2 hours.

From Table 3 above, it is known that the mean degree of removal of NOx from the gas treated in the latter stage of the method of this example is higher by about 15% than that from the gas treated in Comparative Example A and that the mean concentration of NOx in the gas treated by the two-stage removing method of this example is about 1/10 of that in the gas treated by the one-stage removing method of Example 2. From these, it is obvious that the effect of the two-stage method of this example for removing NOx from exhaust gas is significantly improved. Comparing the data of the two-stage removing method of this example with those of Comparative Example B where the conventional method was repeated two times, it is obvious that the mere repetition of the conventional method is far from the effect of the two-stage method of this example.

According to the method of removing nitrogen oxide from exhaust gas of this example that has been described in detail hereinabove, the process of making city water adhered onto the surfaces of the glass fibers 5a followed by bringing the NOx-containing gas (g) into contact with said city water on the surfaces of the glass fibers 5a, thereby making said city water absorb NOx, is repeated two times. Therefore, it is possible to more efficiently absorb and remove NOx from an NOx-containing gas according to the method of this example.

In addition, since the apparatus for removing nitrogen oxide of this example comprises the nitrogen oxide-removing units 32a and 32b connected in two stages, in which the gas-discharging outlet 13a of the nitrogen oxide-removing unit 32a is connected to the gas-introducing inlet 12b of the nitrogen oxide-removing unit 32b via the duct 33, the tanks 19a and 19b are connected via the duct 34 and the duct 34 is provided with the pump 35 by which the NOx-absorbed city water pooled in the tank 19b is circulated to the tank 19a, the constitution of the apparatus itself is simple. Using the apparatus having such a simple constitution, it is possible to efficiently remove NOx from the gas (g) that has been introduced into said apparatus. In addition, since the constitution of the apparatus is simple, the cost of the apparatus itself is low and the maintenance of the apparatus is easy. Moreover, since only city water is circulated through the apparatus, the running cost for driving the apparatus is low and the apparatus can be driven safely.

EXAMPLE 4

Figure 6:
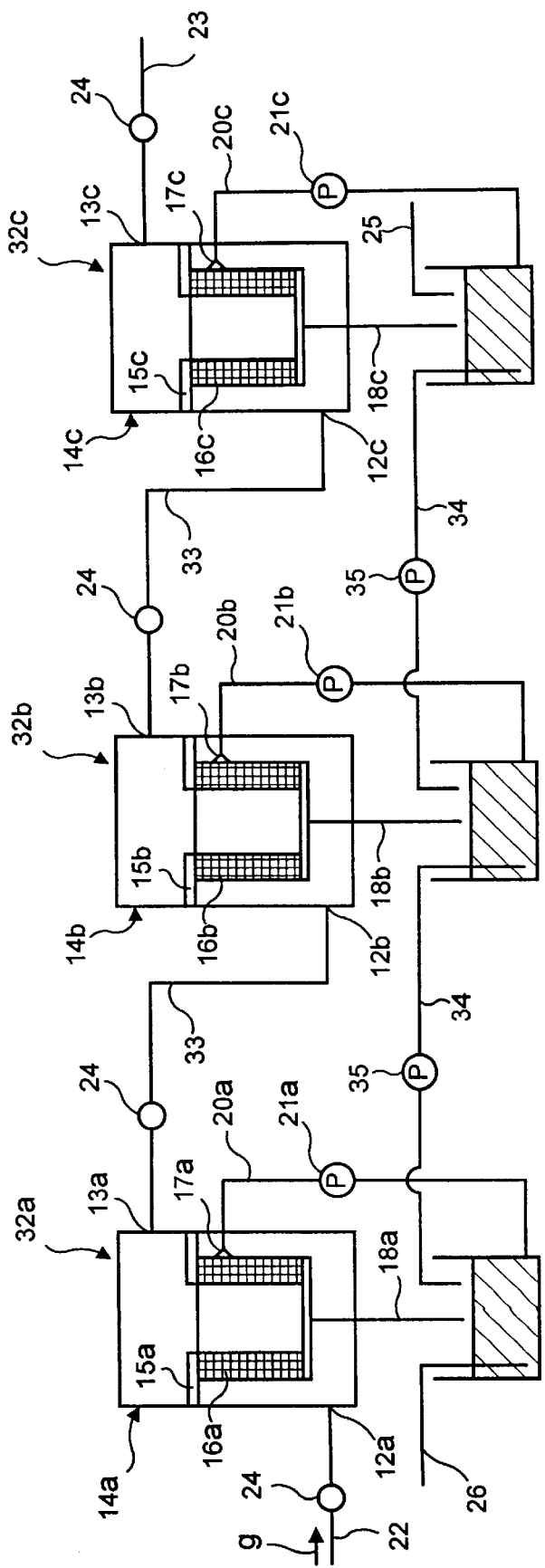
FIG. 6 is a constitutional view showing the outline of the apparatus for removing nitrogen oxide of Example 4 of the present invention.

FIG. 6 is referred to, which is a constitutional view showing the outline of the apparatus for removing nitrogen oxide of Example 4 of the present invention.

This apparatus for removing nitrogen oxide is different from that in the previous Example 3 only in that this comprises three nitrogen oxide-removing units that have been connected in series in which NOx is removed from an NOx-containing gas in three steps. The constitution of each of these nitrogen oxide-removing units is the same as that of the removing apparatus of the above-mentioned Example 2. The reference numbers in each unit are represented by the same ones in the apparatus of Example 2, except that the additional codes "a", "b" and "c" are added to the corresponding reference numbers in the first, second and third units, respectively. The detailed description of these constitutive elements in these units is omitted herein.

In driving the removing apparatus of this example, a gas (g) containing NOx is circulated through these plural nitrogen oxide-removing units 32a to 32c in order, while conducting the three steps each of making the NOx-containing gas brought into contact with city water that has adhered onto the surfaces of the glass fibers 5a and removing NOx from said gas (g) in order. Therefore, NOx is efficiently absorbed by the city water adhered on the surfaces of the glass fibers and is therefore removed from the gas (g) in order in each of the three steps. The thus-absorbed NOx is oxidized, like in the above-mentioned Examples 2 and 3, to be converted into nitric acid having a concentration of 25% or more, and it finally becomes a highly-concentrated nitric acid, which is recovered and recycled.

Table 4 below shows the results of the experiments that have been conducted to confirm the effect of the three-stage removing apparatus of this example. In order to compare the effect of the three-stage removing apparatus of this example with that of the two-stage removing apparatus of the above-mentioned Example 3, said Example 3 is referred to as Comparative Example C in Table 4. In addition, the conventional process referred to in Table 2 as Comparative Example was repeated three times and the data obtained are shown in Table 4 as those of Comparative Example d.

TABLE 4

|  | Amount of Gas Treated ($m^3$/min) | Mean Concentration of NOx in Gas before Treatment (ppm) | Mean Concentration of NOx in Gas after First-stage Treatment (ppm)* | Mean Concentration of NOx in Gas after Second-stage Treatment (ppm)* | Mean Concentration of NOx in Gas after Third-stage Treatment (ppm)* | Mean Degree of Removal of NOx (%)[+] |
|---|---|---|---|---|---|---|
| Example of the Invention | 0.8 | 180000 | 46800 | 4900 | 170 | 99.9 |
| Comparative Example C | 0.8 | 180000 | 41400 | 7900 | — | 95.6 |
| Comparative Example D | 0.8 | 180000 | 126000 | 100900 | 85700 | 52.4 |

*: Mean concentration of NOx in the treated gas during the treatment for 2 hours.
[+]: Mean degree of removal of NOx from the treated gas during the treatment for 2 hours.

From Table 4 above, it is known that the mean degree of removal of NOx from the gas treated in the last stage of the method of this example is higher by about 4.3% than that from the gas treated in Comparative Example C and that the mean concentration of NOx in the gas treated by the three-stage removing method of this example is lower than about 1/10 of that in the gas treated by the two-stage removing method of Example 3. From these, it is obvious that the effect of the three-stage method of this example for removing NOx from exhaust gas is significantly improved and that almost all NOx is removed from the gas treated by the three-stage method of this example. Comparing the data of the three-stage removing method of this example with those of Comparative Example D where the conventional method was repeated three times, it is obvious that the mere repetition of the conventional method is far from the effect of the three-stage method of this example.

According to the method of removing nitrogen oxide from exhaust gas of this example that has been described in detail hereinabove, the process of making city water adhered onto the surfaces of the glass fibers 5a followed by bringing the NOx-containing gas (g) into contact with said city water on the surfaces of the glass fibers 5a, thereby making said city water absorb NOx, is repeated three times. Therefore, it is possible to much more efficiently absorb and remove NOx from an NOx-containing gas according to the method of this example to such a degree that the treated gas contains almost no NOx therein.

In addition, since the apparatus for removing nitrogen oxide of this example comprises the nitrogen oxide-removing units 32a to 32c connected in three continuous stages, the constitution of the apparatus itself is simple. Using the apparatus having such a simple constitution, it is possible to more efficiently remove NOx from the gas (g) that has been introduced into said apparatus. In addition, since the constitution of the apparatus is simple, the maintenance of the apparatus is easy and the running cost for driving the apparatus is low.

While the invention has been described in detail and with reference to specific embodiments thereof, it will be apparent to one skilled in the art that various changes and modifications can be made therein without departing from the spirit and scope thereof.

What is claimed is:

1. A method for removing nitrogen oxides from gas comprising contacting an aqueous solution capable of absorbing nitrogen oxides with a filter of laminated glass fibers to adhere the aqueous solution to the surface of the glass fibers and contacting a gas containing nitrogen oxides with the adhered aqueous solution to absorb the nitrogen oxides therein and remove the nitrogen oxides form the gas, wherein the filter comprises laminated glass fibers which are wound up into a cylindrical element and has a density of from 250 kg/m$^3$ to 300 kg/m$^3$.

2. The method for removing nitrogen oxide from gas as claimed in claim 1, in which said aqueous solution oxidize said nitrogen oxide.

3. The method for removing nitrogen oxide from gas as claimed in claim 1, in which said aqueous solution is water containing an oxidizing agent.

4. The method for removing nitrogen oxide from gas as claimed in claim 3, in which said oxidizing agent is hydrogen peroxide.

5. The method for removing nitrogen oxides from gas as claimed in claim 1, wherein the aqueous solution consists essentially of water.

6. The method for removing nitrogen oxides from gas as claimed in claim 1, wherein the aqueous solution comprises water and nitric acid.

* * * * *